United States Patent
Hodjati et al.

(10) Patent No.: US 7,319,928 B2
(45) Date of Patent: Jan. 15, 2008

(54) METHOD FOR REAL TIME DETERMINATION OF THE MASS OF PARTICLES IN A PARTICLE FILTER OF A MOTOR VEHICLE

(75) Inventors: Shahin Hodjati, Paris (FR); Christian Bert, Epinay s/Orge (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 10/584,199

(22) PCT Filed: Dec. 15, 2004

(86) PCT No.: PCT/FR2004/050694

§ 371 (c)(1),
(2), (4) Date: Dec. 11, 2006

(87) PCT Pub. No.: WO2005/064143

PCT Pub. Date: Jul. 14, 2005

(65) Prior Publication Data

US 2007/0150162 A1    Jun. 28, 2007

(30) Foreign Application Priority Data

Dec. 23, 2003   (FR)   ................................... 03 15259

(51) Int. Cl.
*B01D 46/42*   (2006.01)
*F02B 33/44*   (2006.01)
*G01N 33/497*  (2006.01)

(52) U.S. Cl. .................... 701/102; 73/23.32; 60/280

(58) Field of Classification Search ............. 701/102, 701/105, 115; 60/280, 295, 297, 612; 73/23.32, 73/28.01
See application file for complete search history.

(56) References Cited

U.S. PATENT DOCUMENTS 6,980,902 B2 * 12/2005 Nakazawa .................. 701/102

FOREIGN PATENT DOCUMENTS

DE    102 34 340    10/2003

(Continued)

OTHER PUBLICATIONS

Kladopoulou E.A. et al., "A Study Describing the Performance of Diesel Particulate Filters During Loading and Regeneration—A Lumped Parameter Model for Control Applications", SAE Technical Papers Series, XP 002328841, pp. 1-20, 2003.

(Continued)

*Primary Examiner*—Willis R. Wolfe
*Assistant Examiner*—Johnny H. Hoang
(74) *Attorney, Agent, or Firm*—Oblon, Spivak, McClelland, Maier & Neustadt, P.C.

(57) ABSTRACT

A method for real-time determination of the mass of particles in a particle filter fitted to the exhaust line of an internal combustion engine. The following data—temperature T(t) of the exhaust gas at the filter input, oxygen [$O_2$ (t)] and nitrogen oxide [$NO_x$(t)] concentration of the exhaust gases entering the filter—is used to calculate the rate of combustion of the particles in the particle filter with the aid of kinetic laws of chemical reactions of particle combustion. The rate, the rate emission of particles from the engine F(t), and the mass of particles in the filter $m_c(t-\Delta,.t)$ obtained during the cycle of operations prior to the moment $t-\Delta t$, is then used to calculate the mass of particles in the filter, $m_c(t):=m_c(t-\Delta t)+[F(t) V(t)]*\Delta t$.

10 Claims, 1 Drawing Sheet

FOREIGN PATENT DOCUMENTS

Figure 1:
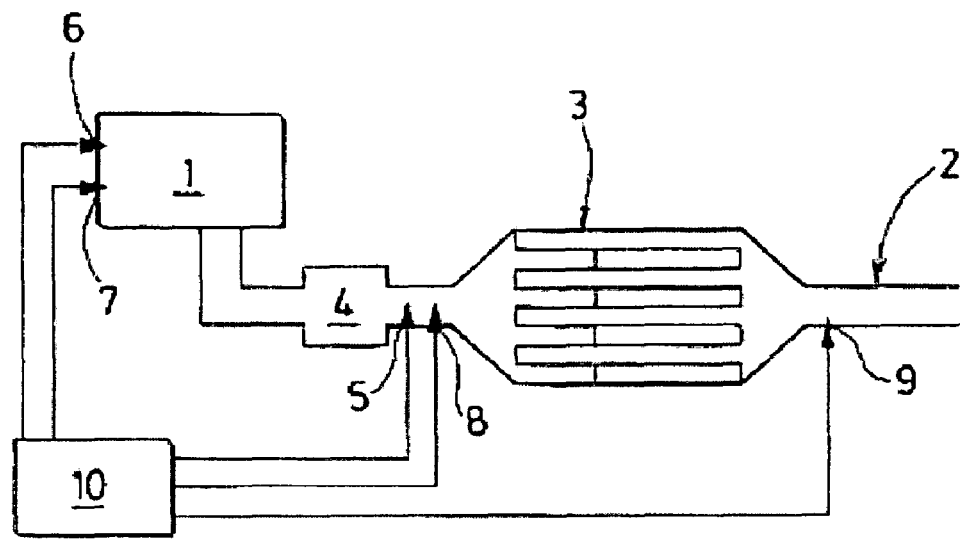

| | | |
|---|---|---|
| EP | 1 108 862 | 6/2001 |
| FR | 2 657 649 | 8/1991 |
| FR | 2 774 421 | 8/1999 |
| JP | 2002 097930 | 4/2002 |
| JP | 2002 332823 | 11/2002 |

OTHER PUBLICATIONS

Konstandopoulos A. G. et al., "Fundamental Studies of Diesel Particulate Filters: Transient Loading, Regeneration, Aging" SAE Technical Paper Series, XP 002328842, pp. 1-23, 2000.

* cited by examiner

METHOD FOR REAL TIME DETERMINATION OF THE MASS OF PARTICLES IN A PARTICLE FILTER OF A MOTOR VEHICLE

The invention relates to a method for real-time determination of the mass of particles present in a particle filter for the combustion engine of a motor vehicle.

The invention also relates to the use of this method in a method for management of an engine, especially engines running on lean mixture.

As it happens, the heterogeneity of the combustion processes in engines running on lean mixture has the effect of generating carbon particles which cannot be burned efficiently by the engine. That is expressed by the production of black exhaust smoke, characteristic of this type of engine, especially during starting phases and during hard accelerations. Compliance with future legislative standards requires the use of depollution systems capable of completely eliminating the particles as well as the nitrogen oxides.

For this purpose there is now available a semi-porous element forming a particle filter in the exhaust line, which permits the gaseous components to pass but retains the particulate constituents. In diesel engines, the fumes make us the basic constituent of these particulate compounds.

However, when the filter is considered to be full, a purge must be carried out in order to regenerate it. Thus each phase of retention of particles must be followed by a regeneration phase, during which the retained compounds are eliminated as non-polluting constituents (carbon dioxide and water). A new phase of accumulation of particulate compounds can then begin.

These particles are usually eliminated by combustion at a temperature of approximately 600° C. However, the exhaust gases of these engines rarely reach such a temperature during normal operation: it is necessary to raise the temperature specifically during the regeneration phase.

The means currently used proceed by creating a gaseous environment heated to a temperature of approximately 600° C. This operation makes it possible to favor spontaneous ignition of the carbon particles retained in the filter. These particles are then consumed with liberation of energy, which, depending on the conditions, can be transmitted by weight to the bed of particles in the filter, to the various components of the depollution system (particle filter, holding box and jacket, piping, etc.), or else transported by the flow of gases discharged from the engine.

It is therefore important to know, at each instant, the mass of particles contained in the filter, particularly at the end of a regeneration, in order to optimize management of the sequence of regeneration phases and to monitor the integrity of the filter. In fact, combustion of an excessive quantity of particles may cause degradation or destruction of the filter by reason of the highly exothermic nature of this reaction.

In general, the mass of particles present in the filter is estimated by measuring the head loss caused by the filter, as described, for example, in French Patent 2774421. However, the mass estimated in this way is not always sufficiently precise, with the result that the filter can suffer degradation.

French Patent 2657649 discloses, for different operating conditions, different strategies for regeneration and for control of regeneration. More precisely, that document proposes to use an estimator of the mass of particles contained in the filter in order to implement or stop, as a function of engine speed and operating load, the different regeneration strategies used. The estimate of the mass of particles contained in the filter is determined using a difference between the mass of particles entering the filter from the engine emissions and the mass of particles consumed by combustion of the particles in the filter. These masses are determined directly from maps as a function of the operating parameters of the engine, and so they also are not always sufficiently precise that degradation of the filter can be avoided.

The object of the invention is to alleviate these drawbacks by proposing a method for real-time determination of the mass of particles present in a particle filter, wherein it is possible to achieve an improvement in the precision of calculation of the mass.

The method according to the invention also has the advantage that it needs only one temperature sensor at the inlet of the filter, which will therefore not suffer deterioration in the event that combustion of the particles were nevertheless to be too exothermic.

To this end, the object of the invention relates to a method for real-time determination of the mass of particles present in a particle filter installed in the exhaust line of an internal combustion engine, characterized in that the following sequence of operations is repeated at determined time intervals $\Delta t$:

(i) at the instant t, the temperature $T(t)$ of the exhaust gases at the inlet of the particle filter is measured using a temperature sensor, (ii) at the instant t, the operating parameters of the engine are measured by means of sensors, (ii) at the instant t, there are read, from pre-established tables, as a function of the operating parameters of the engine, the values of the following parameters: oxygen concentration $[O_2(t)]$ and nitrogen oxides concentration $[NO_x(t)]$ of the exhaust gases entering the particle filter, and the rate $F(t)$ of emission of particles from the engine, (iv) at the instant t, using the kinetic laws of chemical reactions of combustion of particles, there is calculated the rate $V(t)$ of combustion of the particles in the particle filter by means of the following parameters: temperature $T(t)$, concentrations $[O_2(t)]$, $[NO_x(t)]$ of oxidizing agents, and mass $m_c(t-\Delta t)$ of particles present in the filter, obtained during the preceding cycle of operations at the instant $t-\Delta t$, (v) at the instant t, there is calculated the mass $m_c(t)$ of particles present on the filter, using the mass $m_c(t-\Delta t)$ of particles obtained during the preceding cycle of operations according to the following formula:

$$m_c(t) = m_c(t-\Delta t) + [F(t) - V(t)] * \Delta t,$$

where $\Delta t$ is the time interval between the instants $t-\Delta t$ and t, (vi) the value calculated at the instant t for the mass $m_c(t)$ of particles present on the filter is recorded so that it can be used in the following sequence of operations at the instant $t+\Delta t$.

In another embodiment, one or more values of the parameters $[O_2(t)]$, $[NO_x(t)]$, $F(t)$ is or are obtained by measurement with sensors instead of by reading. Thus steps (ii) and (iii) can be omitted in the case that the three values are measured by sensors.

The invention also relates to the use of the method according to the invention for real-time determination of the mass of particles to monitor and/or control a method for management of the regeneration of a particle filter of a motor vehicle. Since the method according to the invention makes it possible to obtain a better evaluation of the mass of particles present in the filter at each instant, initiation of regeneration can be prevented if the quantity of particles detected would risk endangering the integrity of the filter following an excessive temperature rise during combustion.

In an alternative version, the determination method according to the invention is used when the temperature at the inlet of the filter ranges between approximately 250° C. and 500° C. Outside this temperature range, a different method for determination of the mass can then be used, for example by employing a measurement of the loss of head in the particle filter.

The invention also relates to the use of the method according to the invention for real-time determination of the mass of particles in a method for management of the regeneration of a particle filter of a motor vehicle, to determine, for each operating point of the engine of a vehicle, a threshold mass of particles, below which the filter will tend to become loaded with particles and above which the rate of combustion of the particles in the filter will tend to increase.

Figure 2:
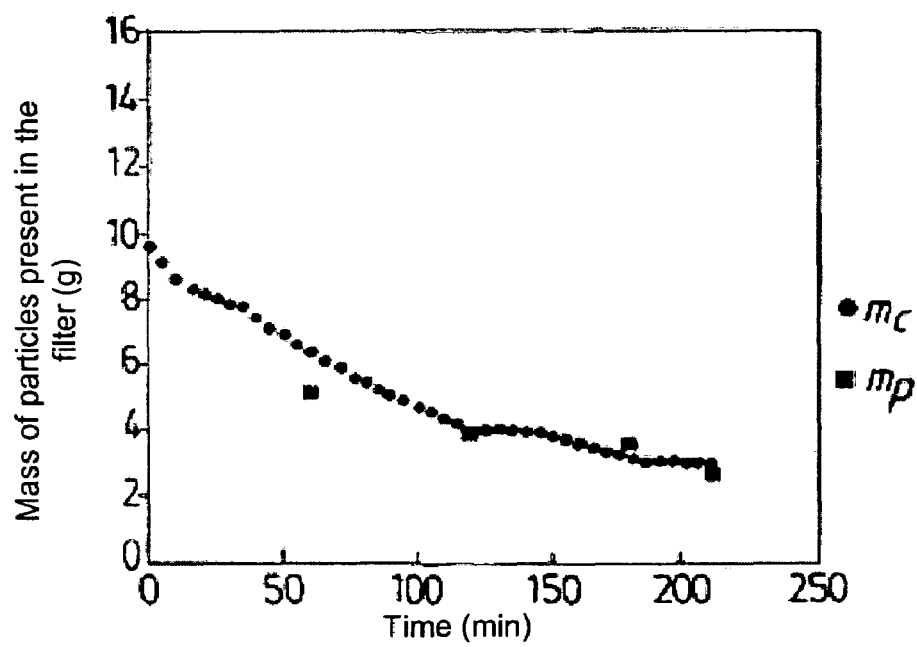

The invention now is described with reference to the attached, non-limitative drawings, wherein:

FIG. 1 is a schematic representation of an engine and its exhaust line equipped with a particle filter, FIG. 2 is the plot, as a function of time, of the mass (4 of particles present in the filter calculated according to the method of the invention and of the mass ($m_p$) of particles as measured by weighing.

Referring to FIG. 1, an engine 1 is connected to an exhaust-gas line 2 equipped with a particle filter 3. Upstream from filter 3 relative to the direction of circulation of the exhaust gases, an oxidation catalyst 4 is installed in the exhaust line in order to oxidize the nitric oxide in the exhaust gases to nitrogen oxides $NO_x$.

A temperature sensor 5 is provided in the exhaust line, at the inlet of particle filter 3.

Engine speed sensor 6 and engine load sensor 7 are provided in the engine to measure the speed Ne of the engine (number of revolutions per minute) and the load Q of the engine corresponding to the depression of the accelerator pedal.

Pressure sensors 8 and 9 are placed respectively at the inlet and outlet of particle filter 3.

The different sensors 5 to 9 are connected to a calculator 10, in which there are recorded tables or maps characteristic of the engine. These tables are preestablished by preliminary measurements performed for each engine.

The method for determination of the mass $m_c(t)$ of particles present in the filter at the instant t now is described.

This method consists in repeating, at determined time intervals $\Delta t$, the sequence of operations described below:

(i) In a first operation, there is measured, at the instant t, the temperature T(t) of the exhaust gases at the inlet of the particle filter, by using temperature sensor 5. The value obtained is recorded in calculator 10.

(ii) In substantially simultaneous manner, there are measured, at the instant t, the operating parameters Ne and Q of the engine, by means of sensors 6 and 7. The measured values are also recorded in calculator 10.

(iii) Using the values Ne and Q measured at the instant t as inputs, calculator 10 then uses the tables preestablished as functions of the values Ne and Q to read the values of the following parameters: oxygen concentration $[O_2(t)]$ and nitrogen oxides concentration $[NO_x(t)]$ of the exhaust gases entering the particle filter, and the rate F(t) of emission of particles from the engine. These read values correspond to the values at the instant t, and are recorded in calculator 10.

It is possible, however, to replace this operation of reading from the tables by measurements of a sensor placed at the inlet of the filter to measure the concentrations $[O_2(t)]$ and $[NO_x(t)]$ of oxygen and nitrogen oxides, and by a measurement of a particle analyzer (also placed at the inlet of the filter) to measure the rate F(t) of emission of particles from the engine. Step (ii) can then be omitted.

(iv) Calculator 10 then proceeds to calculate the rate V(t) of combustion of the particles in the particle filter at the instant t. As input data, the calculator uses the previously measured or read parameters: temperature T(t), concentrations $[NO_x(t)]$ and $[O_2(t)]$ of nitrogen oxides and oxygen, as well as the mass $m_c(t-\Delta t)$ of particles present in the filter, obtained during the preceding cycle of operations at the instant $t-\Delta t$. For this purpose, the calculator uses the kinetic laws of the chemical reactions of combustion of particles, the formulas for which are pre-recorded. These laws will be described in detail hereinafter.

(v) In the following operation, the calculator calculates the mass $m_c(t)$ of particles present on the filter at the instant t, by using the mass $m_c(t-\Delta t)$ of particles obtained during the preceding cycle of operations at the instant $t-\Delta t$, by means of the following formula:

$$m_c(t)=m_c(t-\Delta t)+[F(t)-V(t)]*\Delta t, \quad (E)$$

where $\Delta t$ is the time interval between the instants $t-\Delta t$ and t.

(vi) The value calculated for the mass $m_c(t)$ of particles present on the filter at the instant t is then recorded in order to be used as input value in the sequence of operations following the instant $t+\Delta t$, particularly in operations (iv) and (v).

The sequence of operations described in the foregoing is then performed once again at the instant $t+\Delta t$.

At the initial instant $t_i$, when no mass $m_c(t-\Delta t)$ is available, the calculator then uses a mass $m_{pressure}(t_i)$ of particles present on the filter, estimated by using, in standard manner, the head loss or pressure difference $\Delta P$ between the inlet and outlet of filter 3 at the instant $t_i$. As an example, this pressure difference is calculated by using the measurements of pressure sensors 8 and 9 as input values.

It is also possible to resort to this estimated mass $m_{pressure}$ of particles at subsequent instants t of operation of the engine, for example for purposes of monitoring the mass $m_c(t)$ calculated according to the method of the invention.

In this way the mass of particles present on the filter is corrected in real time as a function of the operating point of the engine, thus making it possible to achieve precision clearly superior to that of the known methods for determination of the mass.

We now will describe the kinetic laws used by the calculator according to the invention.

The reaction of combustion of the particles (soot) in a catalytic particle filter (active phase of the filter containing a catalyst) is initiated according to three different and complementary processes:

(1) The first process corresponds to the combustion of particles by oxidation by the nitrogen oxides $NO_x$ contained in the exhaust gases or formed by reaction of the nitric oxide on platinum sites present in the active phase deposited by the filter. This reaction takes place in the range of approximately 250 to 500° C.

(2) The second process corresponds to the action of the catalyst of the active phase of the filter. The catalyst has an oxygen-donor character and supplies oxygen for oxidation of the particles. This process begins around 350° C.

(3) The third process corresponds to combustion of the particles by the oxygen present in the exhaust gases. Initiated at around 450 to 500° C., this process intensifies with temperature and in particular is responsible for active regeneration of the filter around 600° C.

The rates of reaction of these different processes can be expressed as kinetic equations in the following form (the rates are expressed in mg/s):

Process (1):

$$V_{NO_x} = K_1 e^{-Ea1/RT(t)} \times [m_c(t-\Delta t)]^{a1} \times [NO_x(t)]^b$$

Process (2):

$$V_{O_{2catalyst}} = K_2 e^{-Ea2/RT(t)} \times [m_c(t-\Delta t)]^{a2} \times [O_{2catalyst}(t)]^c$$

Process (3):

$$V_{O_2} = K_3 e^{-Ea3/RT(t)} \times [m_c(t-\Delta t)]^{a3} \times [O_2(t)]^d$$

where:

T(t) represents the temperature measured at the inlet of the filter, $m_c(t-\Delta t)$ represents the mass of particles (in grams) present on the filter at the instant $t-\Delta t$ and calculated during the previously executed sequence of operations, $[NO_x(t)]$ represents the concentration of nitrogen oxides (in ppm) in the exhaust gases entering the filter at the instant t, $[O_{2catalyst}(t)]$ represents the concentration of oxygen (in percent) available in the active phase ("wash coat") at the instant t, $[O_2(t)]$ represents the concentration of oxygen (in percent) in the exhaust gases entering the filter at the instant t, $K_1$, $K_2$, $K_3$ are pre-exponential factors of the combustion reactions of processes (1), (2), (3) respectively, Ea1, Ea2, Ea3 are the activation energies of the combustion reactions of processes (1), (2), (3) respectively, a1, a2, a3, b, c, d are the partial reaction orders with respect to the mass of soot and of oxidizing agent ($NO_x$ or $O_2$), R is the universal gas constant.

The kinetic parameters $K_1$, $K_2$, $K_3$, Ea1, Ea2, Ea3, a1, a2, a3, b, c, d are determined experimentally in standard manner.

In the case of the first rate equation:

$$V_{NO_x} = K_1 e^{-Ea1/RT(t)} \times [m_c(t-\Delta t)]^{a1} \times [NO_x(t)]^b,$$

the following values can be used (for x=2):

-5000<Ea1/R<-2000

0.2<a1<1

0.2<b<2

The pre-exponential factor $K_1$ varies as a function of the concentration of nitrogen dioxide:

If $[NO_2(t)] > 90$ ppm: $K_1 = [NO_2(t)]^2 \times m - [NO_2(t)] \times n + p,$ where: $10^{-8} < m < 10^{-6}$, $10^{-6} < n < 10^{-4}$, $10^{-4} < p < 10^{-2}$.

If $[NO_2(t)] < 90$ ppm: $K_1 = q$, where $10^{-6} < q < 10^{-3}$.

In the case of the second rate equation:

$$V_{O_{2catalyst}} = K_2 e^{-Ea2/RT(t)} \times [m_c(t-\Delta t)]^{a2} \times [O_{2catalyst}(t)]^c,$$

the following values can be used:

-2500<Ea2/R<-1000

1<a2<2.5

0<c<1.5

The pre-exponential factor $K_2$ varies as a function of the temperature at the inlet of the filter or of the quantity of oxygen:

If $T(t) > 260°$ C.; $K_2 = ([T(t)]^2 \times j) - ([T(t)] \times k) + l,$ where: $10^{-9} < j < 10^{-7}$, $10^{-6} < k < 10^{-4}$ $10^{-3} < p < 10^{-2}$.

If $T(t) < 260°$ C. or $[O_2(t)] < 4.6\%$: $K_2 = i$, where $0 < i < 0.2$.

In the case of the third rate equation:

$$V_{O_2} = K_3 e^{-Ea3/RT(t)} \times [m_c(t-\Delta t)]^{a3} \times [O_2(t)]^d$$

the following values can be used:

-25000<Ea3/R<-10000

0.5<a3<2

0<d<1.5

If $[O_2] < 4.6\%$, $K_3 = e^g$, where $15 < g < 30$.

Otherwise $K_3 = n$, where $0 < n < 0.2$.

These parameters, as well as the kinetic rate formulas, are recorded in calculator 10 and used to calculate the rate V(t) of combustion of the particles in the filter. This rate V(t) is the sum of the rates of the three processes:

$$V(t) = V_{NO_x} + V_{O_2} + V_{O_{2catalyst}}.$$

For this case, it will be understood that only the concentrations $[NO_x(t)]$ and $[O_2(t)]$ can be measured if necessary by the sensors, but not $[O_{2catalyst}(t)]$. It is then not possible to omit step (ii) of measuring the operating parameters (Ne, Q) of the engine.

When filter 3 does not contain any catalyst, then the combustion reaction according to process (2) does not take place. The combustion rate is then:

$$V(t) = V_{NO_x} + V_{O_2}.$$

The value calculated in this way for the combustion rate can be used for calculating the mass $m_c(t)$ of particles present in the filter, by using equation (E).

FIG. 2 shows the good agreement between the mass ($m_c$) of particles calculated according to the method of the invention and the mass ($m_p$) of particles effectively present in the filter and determined by weighing.

The sequence of operations used to calculate the mass of particles according to the invention is preferably executed at time intervals $\Delta t$ on the order of one second. Of course, it is possible to use other values.

The invention claimed is:

1. A method for real-time determination of the mass of particles present in a particle filter installed in an exhaust line of an internal combustion engine, comprising the following sequence of operations repeated at determined time intervals $\Delta t$:

(i) at an instant t, measuring the temperature T(t) of the exhaust gases at the inlet of the particle filter using a temperature sensor;

(ii) at the instant t, measuring operating parameters of the engine by sensors;

(iii) at the instant t, reading, from pre-established tables, as a function of the operating parameters of the engine, values of the following parameters: oxygen concentration $[O_2(t)]$ and nitrogen oxides concentration $[NO_x(t)]$ of the exhaust gases entering the particle filter, and the rate F(t) of emission of particles from the engine;

(iv) at the instant t, using the kinetic laws of chemical reactions of combustion of particles, calculating the rate V(t) of combustion of the particles in the particle filter by the following parameters: temperature T(t), concentrations $[O_2(t)]$, $[NO_x(t)]$ of oxidizing agents, and mass $m_c(t-\Delta t)$ of particles present in the filter, obtained during the reading (iii) preceding cycle of at the instant $t-\Delta t$;

(v) at the instant t, calculating the mass $m_c(t)$ of particles present on the filter, using the mass $m_c(t-\Delta t)$ of particles obtained during the preceding cycle of operations according to the following formula:

$$m_c(t)=m_c(t-\Delta t)+[F(t)-V(t)]*\Delta t,$$

where $\Delta t$ is the time interval between the instants $t-\Delta t$ and t, (vi) reading the value calculated at the instant t for the mass $m_c(t)$ of particles present on the filter so that it can be used in the following sequence of operations at the instant $t+\Delta t$.

2. A method according to claim 1, wherein one or more values of the parameters $[O_2(t)]$, $[NO_x(t)]$, F(t) is obtained by measurement with sensors instead of by reading from pre-established tables.

3. A method according to claim 1, wherein for calculation of the rate V(t) of combustion, reactions of combustion of the particles by the nitrogen oxides $NO_x$ and oxygen $O_2$ are considered, the rate of combustion being the sum of the rates of the reactions of combustion of the particles by the nitrogen oxides ($V_{NO_x}$) and oxygen ($V_{O_2}$):

$$V(t)=V_{NO_x}+V_{O_2},$$

where:

$$V_{NO_x}=K_1 e^{-Ea1/RT(t)} \times [m_c(t-\Delta t)]^{a1} \times [NO_x(t)]^b$$

$$V_{O_2}=K_3 e^{-Ea3/RT(t)} \times [m_c(t-\Delta t)]^{a3} \times [O_2(t)]^d$$

where T(t), $[O_2(t)]$, $[NO_x(t)]$ are determined during the preceding operation (iii), a1, a3, b and d are partial orders of the combustion reactions, and Ea1 and Ea3 are activation energies of the reactions of combustion by the nitrogen oxides and oxygen respectively.

4. A method according to claim 3, in which the particle filter contains an active phase for catalyzing combustion of the particles, wherein during calculating the rate of combustion, there is additionally considered the reaction of combustion of the particles by the oxygen present in the active phase of the particle filter, the rate of combustion being the sum of the rates of the reactions of combustion of the particles by the nitrogen oxides ($V_{NO_x}$), by oxygen ($V_{O_2}$) and by the oxygen of the active phase ($V_{O_{2catalyst}}$):

$$V(t)=V_{NO_x}+V_{O_2}+V_{O_{2catalyst}}$$

where $$V_{O_{2catalyst}}=K_2 e^{-Ea2/RT(t)} \times [m_c(t-\Delta t)]^{a2} \times [O_{2catalyst}(t)]^c$$

where $[O_{2catalyst}(t)]$ is the concentration of oxygen in the active phase of the filter at the instant t, read from a table pre-established during a preceding operation as a function of the operating parameters (Ne, Q) of the engine, a2 and c are partial orders, and Ea2 is the activation energy of the reaction of combustion by the oxygen of the active phase.

5. A method according to claim 1, wherein at the initial instant $t_i$, the mass $m_c(t-\Delta t)$ of particles present in the filter and used in operations (iv) and (v) is replaced by a mass ($m_{pressure}(t_i)$) of particles present in the filter, estimated by measuring the head loss between the inlet and outlet of the filter at the instant $t_i$.

6. A method according to claim 5, wherein the mass ($m_{pressure}$) of particles present in the filter, estimated from a measurement of the head loss between the inlet and outlet of the filter, is used in the operations (iv) and (v) at an instant t different from the initial instant.

7. A method according to claim 1, wherein the measurement of the operating parameters of the engine comprises:

sensing the speed Ne of revolution of the engine, by using a speed sensor; and sensing the engine load Q, by using a load sensor.

8. A method for monitoring and/or controlling management of regeneration of a particle filter of a motor vehicle using real-time determination of the mass of particles present in a particle filter installed in an exhaust line of an internal combustion engine, comprising the following sequence of operations repeated at determined time intervals $\Delta t$:

(i) at an instant t, measuring the temperature T(t) of the exhaust gases at the inlet of the particle filter using a temperature sensor;

(ii) at the instant t, measuring operating parameters of the engine by sensors;

(iii) at the instant t, reading, from pre-established tables, as a function of the operating parameters of the engine, values of the following parameters: oxygen concentration $[O_2(t)]$ and nitrogen oxides concentration $[NO_x(t)]$ of the exhaust gases entering the particle filter, and the rate F(t) of emission of particles from the engine;

(iv) at the instant t, using the kinetic laws of chemical reactions of combustion of particles, calculating the rate V(t) of combustion of the particles in the particle filter by the following parameters: temperature T(t), concentrations $[O_2(t)]$, $[NO_x(t)]$ of oxidizing agents, and mass $m_c(t-\Delta t)$ of particles present in the filter, obtained during the reading (iii) preceding cycle of at the instant $t-\Delta t$;

(v) at the instant t, calculating the mass $m_c(t)$ of particles present on the filter, using the mass $m_c(t-\Delta t)$ of particles obtained during the preceding cycle of operations according to the following formula:

$$m_c(t)=m_c(t-\Delta t)+[F(t)-V(t)]*\Delta t,$$

where $\Delta t$ is the time interval between the instants $t-\Delta t$ and t, (vi) reading the value calculated at the instant t for the mass $m_c(t)$ of particles present on the filter so that it can be used in the following sequence of operations at the instant $t+\Delta t$; and monitoring and/or controlling the management of the regeneration of the filter of the motor vehicle based on the real-time determination of the mass of particles present in the particle filter.

9. The method according to claim 8, in which the determination method is used when the temperature at the inlet of the filter is between approximately 250° C. and 500° C.

10. A method for managing regeneration of a particle filter of a motor vehicle using real-time determination of the mass of particles present in a particle filter installed in an exhaust line of an internal combustion engine, comprising the following sequence of operations repeated at determined time intervals $\Delta t$:

(i) at an instant t, measuring the temperature T(t) of the exhaust gases at the inlet of the particle filter using a temperature sensor;

(ii) at the instant t, measuring operating parameters of the engine by sensors;

(iii) at the instant t, reading, from pre-established tables, as a function of the operating parameters of the engine, values of the following parameters: oxygen concentration $[O_2(t)]$ and nitrogen oxides concentration $[NO_x(t)]$ of the exhaust gases entering the particle filter, and the rate F(t) of emission of particles from the engine;

(iv) at the instant t, using the kinetic laws of chemical reactions of combustion of particles, calculating the rate V(t) of combustion of the particles in the particle filter by the following parameters: temperature T(t), concentrations $[O_2(t)]$, $[NO_x(t)]$ of oxidizing agents, and mass $m_c(t-\Delta t)$ of particles present in the filter, obtained during the reading (iii) preceding cycle of at the instant $t-\Delta t$;

(v) at the instant t, calculating the mass $m_c(t)$ of particles present on the filter, using the mass $m_c(t-\Delta t)$ of particles obtained during the preceding cycle of operations according to the following formula:

$$m_c(t)=m_c(t-\Delta t)+[F(t)-V(t)]*\Delta t,$$

where $\Delta t$ is the time interval between the instants $t-\Delta t$ and t, (vi) reading the value calculated at the instant t for the mass $m_c(t)$ of particles present on the filter so that it can be used in the following sequence of operations at the instant $t+\Delta t$; and determining, for each operating point of the engine of the vehicle, a threshold mass of particles, below which the filter will tend to become loaded with particles and above which the rate of combustion of the particles in the filter will tend to increase, based on the real-time determination of the mass of particles present in the particle filter.

* * * * *